April 28, 1953 D. BERLIN 2,636,548
COMBINATION COT AND CHAIR SEAT
Filed Sept. 16, 1949 2 SHEETS—SHEET 1
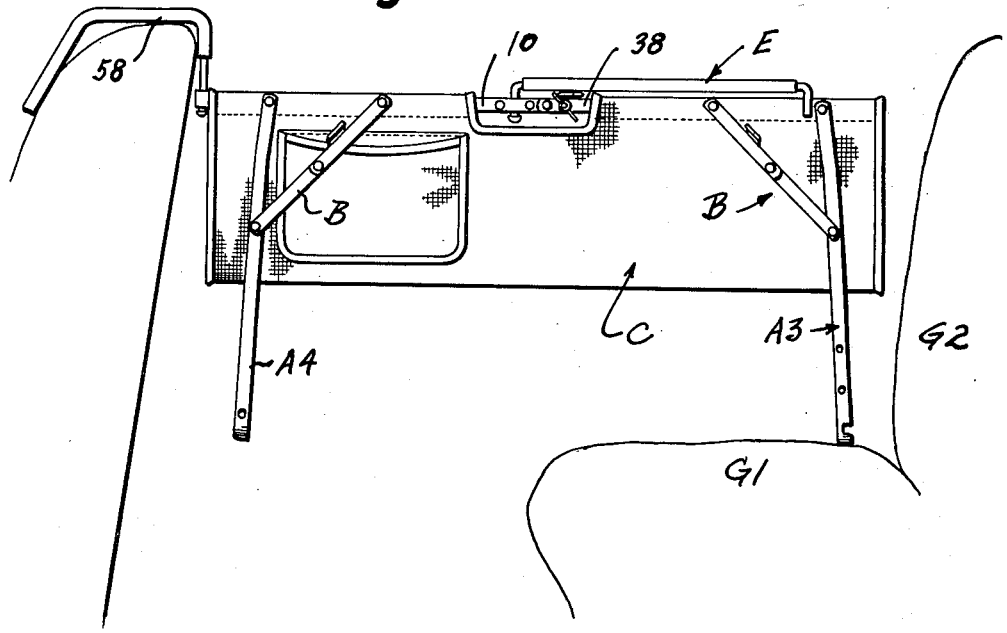
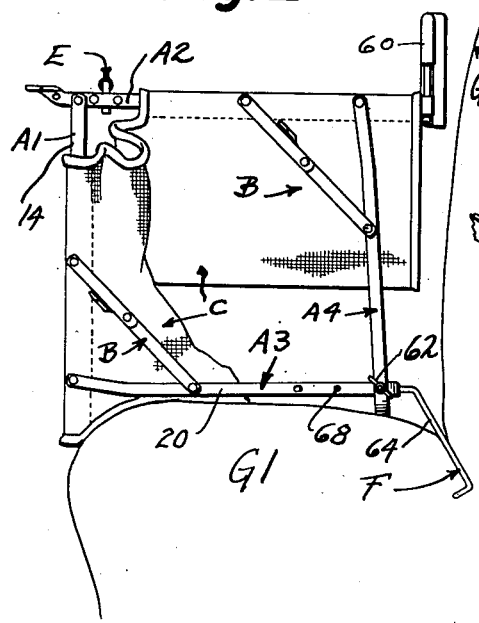
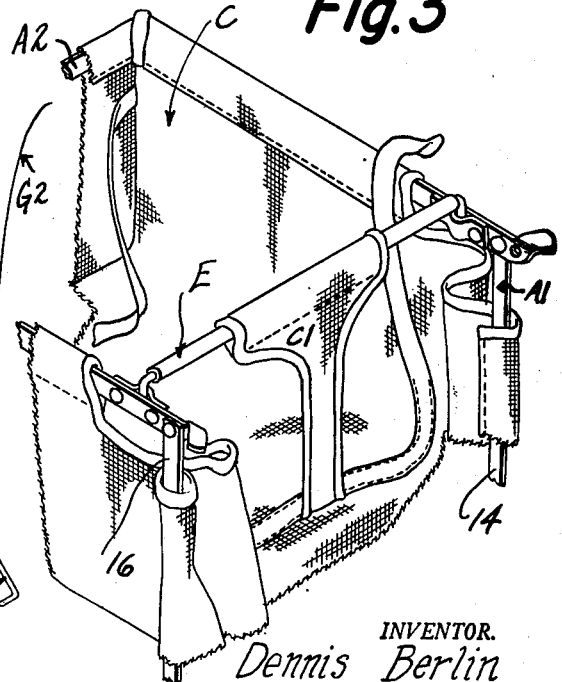
INVENTOR.
Dennis Berlin
BY Harry Langsam
Attorney

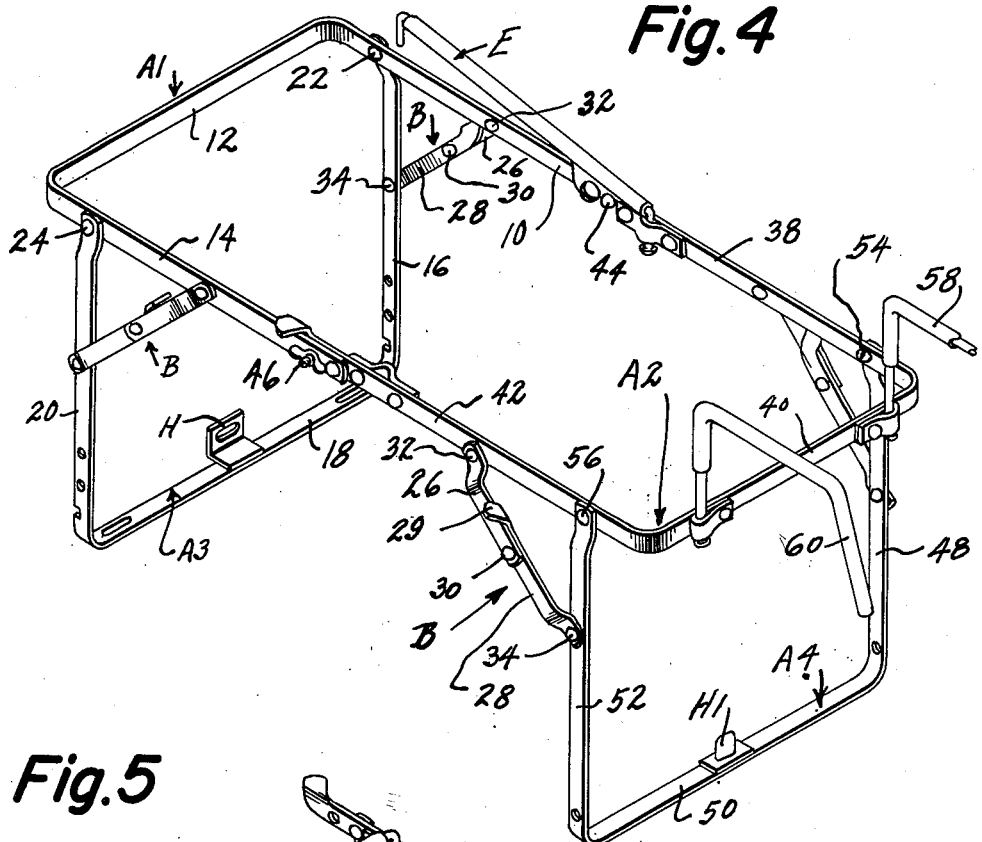

Patented Apr. 28, 1953

2,636,548

UNITED STATES PATENT OFFICE 2,636,548

COMBINATION COT AND CHAIR SEAT

Dennis Berlin, Philadelphia, Pa.

Application September 16, 1949, Serial No. 116,193

1 Claim. (Cl. 155—45)

My invention relates to a carrier for an infant baby, and relates particularly to a combination hammock or cot, and chair seat for use inside an automobile for supporting an infant baby or for providing a cot wherein an infant may rest while the carrier is supported on the ground.

Heretofore, light portable and convertible infant carriers, especially adaptable for use in a passenger motor vehicle whereby the carrier is adapted to be easily attached to the back rest of the seat and for it to rest upon the seat, have been used. However, in the prior art carriers for the infant enabled the infant only to sit in the carrier. In my invention the carrier can easily be used both for the infant to sit therein or to be in a supine or prone position without the addition of any parts to the carrier.

It is, therefore, an object of my invention to provide a combination hammock and chair seat particularly adaptable for use inside a motor vehicle.

Another object of my invention is to provide an infant carrier wherein an infant may be carried in a passenger vehicle either in a sitting or a prone or supine or sleeping position in safety.

Another object of my invention is to provide an infant carrier wherein the infant may be carried in safety either inside a passenger automobile or while the carrier is on the ground.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings in which:

Fig. 1 is a side view of the framework of an infant carrier which may be converted from a cot to a chair seat; the position indicated is in a cot position and it is located upon the back seat of an automobile and it is hung over the back of the front seat of the automobile.

Fig. 2 is a side view of the framework of the carrier shown in Fig. 1 but the carrier is located on an automobile as a chair seat.

Fig. 3 is a perspective view of the fabric shown to hold an infant in the seat.

Fig. 4 is a perspective view of the framework in an open position.

Fig. 5 is a perspective view of the carrier serving as a chair.

Fig. 6 is a perspective view of the carrier pad which may be used for the infant whether the infant is in a seated or prone position.

Referring now in detail to the drawings wherein similar reference characters refer to similar parts, I show an infant carrier adapted to be a chair seat, or it may be converted to a cot. The carrier is adapted to be placed upon either the front or the back seat of an automobile. The seat is adapted to be kept in a predetermined position by hooking the carrier to the backrest of the seat with safety to the infant being carried within the carrier, no matter whether the infant is in a seated condition or lying in a supine or prone position. The carrier also may be used as a bassinet. The carrier also is adapted to be locked between the seat and the back rest of an automobile.

The frame of the carrier comprises a pair of metallic U-shaped members, generally designated as A1 and A2, pivotally jointed together at their free ends; and the frame is pivotally mounted on a pair of U-shaped legs, generally designated as A3 and A4.

The U-shaped member A1 forming a portion of the frame comprises a metal bar bent in the form of a U with the legs 10, 14 joined together with central horizontally extending portion 12. The U-shaped leg portion A3 is a metal bar bent to have vertical legs 16 and 20 with the ground engaging or central member 18 connecting with the vertically extending legs. The leg 16 is pivotally joined at 22 to the frame leg 10 adjacent the junction of the legs 10 and 12. For balance the other leg 20 of the U-shaped supporting member A3 is pivotally connected at 24 to the leg 14 adjacent the junction of the legs 12 and 14. In other words, the legs 16 and 20 are symmetrically pivoted to move in unison.

A stabilizing link, generally designated as B, comprises a pair of hingedly mounted links 26 and 28 which are pivoted together at 30, with one end of the link 26 pivoted at 32 to the bar 10 and the end of the link 28 being pivoted at 34 to the vertical leg 16. The collapsible links 26, 28 serve to prevent the frame from collapsing when it is to be kept open and they enable the frame to be collapsed when it is to be stored, shipped, or it is used in a flat position.

The links 26, 28 may collapse in one direction only since an ear or stop 28 on the link 28 overlies the upper edge of the link 26 intermediate the pivots 30, 32 of the link 26 thereby serving as a stop to limit the swing of link 26 in one direction.

It is to be observed that four sets of stabilizing links B are used but a description of one set applies to all of the links B.

The U-shaped section A2 of the frame is comprised by the legs 38 and 42 connected by the mid-portion 40.

The legs A4 comprise a U-shaped metal section 48, 50, 52, with the integrally formed midsection 50. The free ends of the legs 48, 52 are pivoted at 54 and 56 to the free ends of legs 38 and 50, respectively.

A heavy texture fabric, generally designated as C, which is water repellent and sunproof, is draped over the frame A1 and A2 wherein the infant may be supported from the sides, front and back.

A pad, generally designated as D, is of the mattress type with support boards to add to the comfort of the user and it may be folded along the lines D1 and D2, so that it may be bent at right angles or it may lie flat.

Attached to the center of the fabric C is an auxiliary looped end piece C1 of a width to fit between the legs of the infant and yet not too wide or too narrow and wherein the looped end may have a central bar, generally designated as E, pass through the looped central piece C1 so that the carrier may be used as a seat when the central bar is attached to the legs 10 and 14; and after the portion A1 of the frame is dropped to be at right angles to the frame A1.

A pair of rubber covered hooks 58, 60 is pivoted to swing laterally on the bar 12 and is adapted to be hung over the seat of motor vehicle whereby the carrier, whether used as a seat or a hammock, will carry its occupant safely.

It is to be particularly observed that the U-shaped legs A3 and A4 are adapted to interfit as shown in Fig. 5 whereby the seat is formed. The interfitting or telescoping of the U-shaped legs A3 and A4 permits them to be locked together by a bolt and wing-nut set 62.

Also, I provide a wire holder, generally designated as F, to hold the carrier in place between the automobile seat G1 and the automobile back rest G2. The carrier holding loop F is an integrally formed wire somewhat U-shaped having legs 64, 66 joined by a mid-portion 65.

The legs 64, 66 pass through slots 64A, 66A in the member 18 of the leg A3 and the out-turned end 68 of leg 64 passes through an opening 68A in leg 20. The other out-turned end 70 passes through a complementary opening 70A in the other end 16 of the leg A3. The wire holder F is turned downwardly so that the crosspiece 65 and the legs 64, 66 serves as a hook to prevent the carrier from pulling forwardly of the automobile seat.

The hooks 58, 60 also are pivoted and they are adjustable vertically and horizontally by virtue of friction clamps.

In Figs. 4 and 5 the legs A3 and A4 are locked together by virtue of a recessed plate H on the legs A3 which receive a holding lug H1 on the legs A4 of the rotatable type. In other words, to separate the legs A3 and A4 when they are in a locked position the rotatable lug is moved so that it may be pulled through the recessed plate H thereby separating the legs A3 and A4.

Suitable holding straps and pockets may be used.

Although my invention has been described in considerable detail, such description is intended as being illustrative rather than limiting, since the invention may be variously embodied, and the scope of the invention is to be determined as claimed.

I claim as my invention:

A combination cot and chair infant carrier which may be optionally opened to serve as a cot or as a chair seat, comprising a frame made up of a pair of generally U-shaped members pivoted to each other at their ends, a third generally U-shaped member pivoted at its ends to one of said first mentioned U-shaped members and having a plate connected to the mid-section thereof, said plate having a generally rectangular recess therein, a fourth generally U-shaped member pivoted at its end to the other of said first mentioned U-shaped members and having a rectangular rotatable lug provided on the mid-section thereof, said third and fourth U-shaped members being adapted to be positioned perpendicularly to each other with their respective midsections in abutting relationship when said first mentioned U-shaped members are swung into right angular relation to each other, and said rotatable lug being adapted to enter said recess and to be rotatably locked within said recess when said third and fourth U-shaped members are in abutting relationship, a wire holder adapted to be inserted between an automobile seat and back, said wire holder being of U-shaped configuration and having outturned ends, one of said U-shaped members having a pair of spaced slots in the connecting mid-portion whereby the spaced ends of said U-shaped wire holder pass through said slots, and each side of said last named U-shaped member having a small opening therein to receive each outturned end of said wire holder whereby said wire holder is rigidly held in position and easily detachable.

DENNIS BERLIN.

References Cited in the file of this patent

UNITED STATES PATENTS

| Number | Name | Date |
| --- | --- | --- |
| 1,160,458 | Smith | Nov. 16, 1915 |
| 1,224,709 | Cholet | May 1, 1917 |
| 2,482,827 | Black | Sept. 27, 1949 |
| 2,488,225 | Mover | Nov. 15, 1949 |